Aug. 8, 1961  I. MacLAREN FISHER  2,995,671
CONTROLLING THE TIMING AND SEQUENCE OF OPERATIONS
IN WASHING, DYEING, BLEACHING
AND SIMILAR MACHINES
Filed Oct. 31, 1955  2 Sheets-Sheet 1
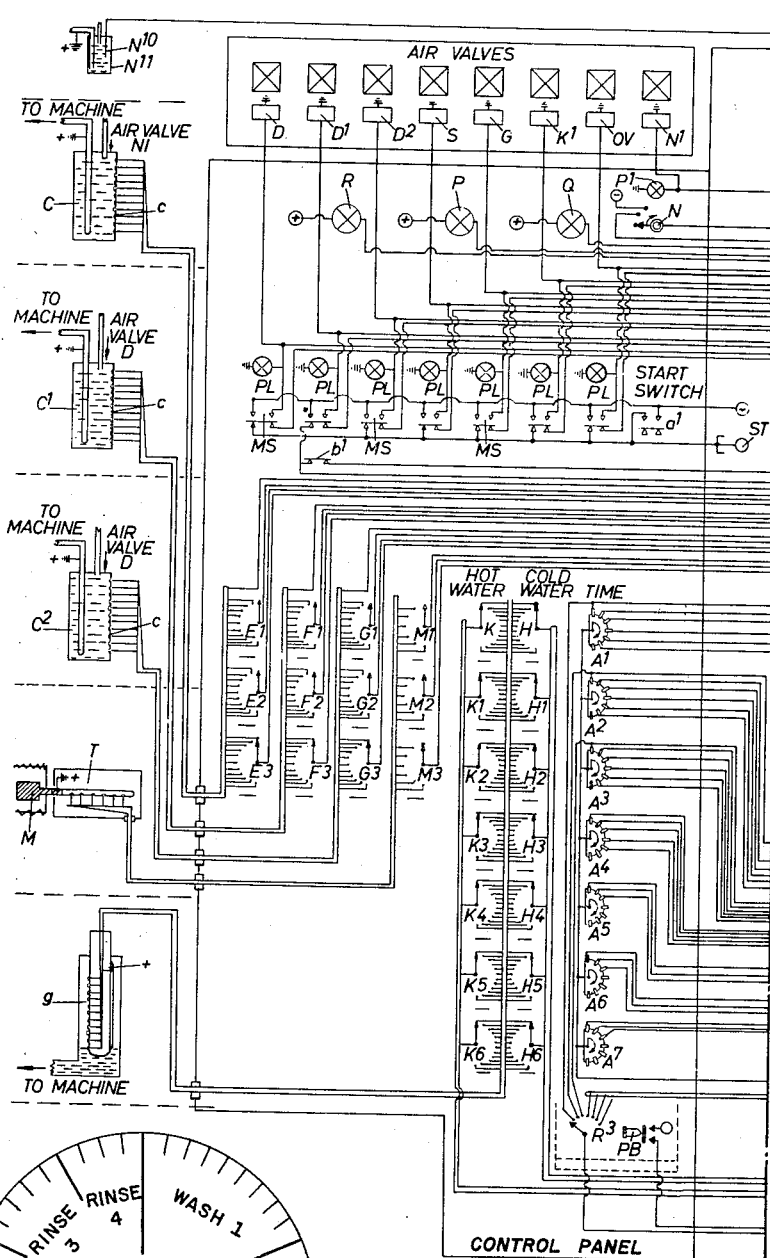
—FIG. 1.—
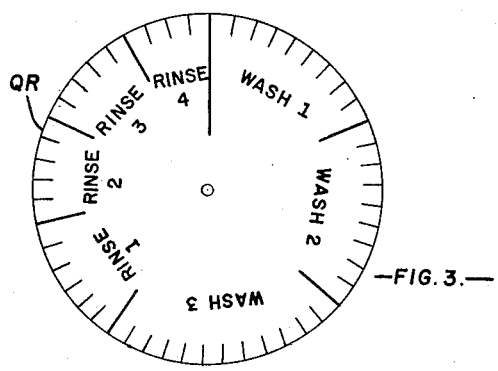
—FIG. 3.—
INVENTOR
Ian MacLaren Fisher
BY
Michael S. Striker
ATTORNEY

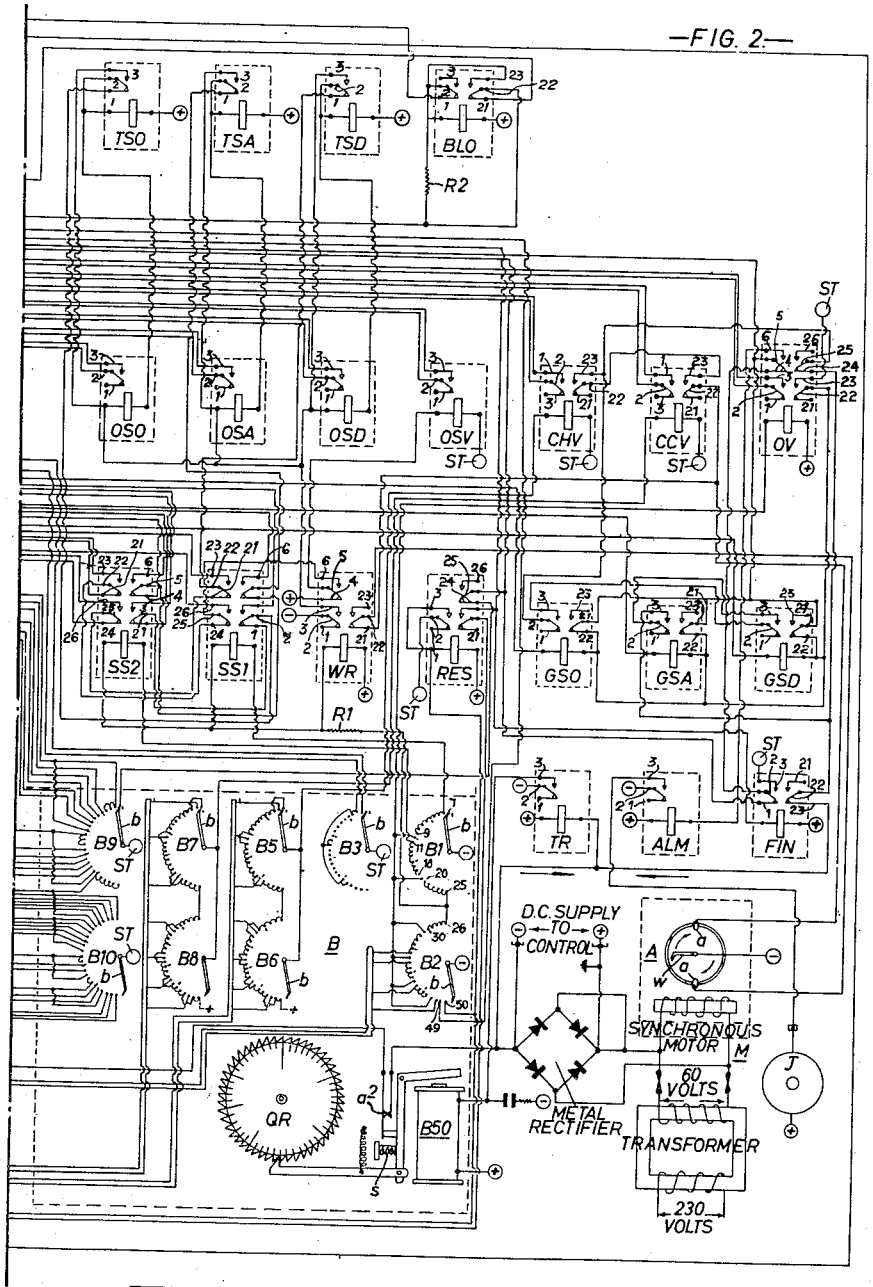

ically stepped uniselector, a pair of contact banks of which, in conjunction with a set of switches control the timing of the successive stages of an operating cycle and further contact banks of which are connected through pre-selector switches and relays to control the operating conditions of each stage.

2,995,671
CONTROLLING THE TIMING AND SEQUENCE OF OPERATIONS IN WASHING, DYEING, BLEACHING AND SIMILAR MACHINES

Ian MacLaren Fisher, Shroggs, Wood Top, Hebden Bridge, England; Margaret Harrall Fisher executrix of said Ian MacLaren Fisher, deceased
Filed Oct. 31, 1955, Ser. No. 543,934
2 Claims. (Cl. 307—141)

This invention relates to improvements in mechanism for controlling the operation of laundry or textile washing, dyeing, bleaching or similar machines.

It has been proposed in specification No. 579,659 to generate pulses of a predetermined fundamental frequency, to distribute the pulses through a plurality of channels, to selectively connect any one or more of said channels to an output circuit to obtain in said output circuit a range of pulse frequencies including the fundamental frequency and sub-multiples of the fundamental frequency and to employ the pulses so obtained to actuate electrical devices in timed sequence. The pulses actuate a rotary line switch or uni-selector, a bank or banks of contacts of which, step by step are connected to an output circuit.

In specification No. 452,938 and addition No. 498,129, it has been proposed to carry out a series of operations for laundry washing machines through a plurality of cams controlling the particular sequence of operations.

According to the invention the mechanism comprises an electro-magnetically stepped uniselector, a pair of contact banks of which, in conjunction with a set of switches control the timing of the successive stages of an operating cycle and further contact banks of which are connected through pre-selector switches and relays to control the operating conditions of each stage.

The invention will be described with reference to the accompanying drawing in which the sequence of events, quantities, temperatures and times, associated with a laundry of textile washing machine are controlled automatically after the apparatus has been pre-set to give the desired washing cycle, thus eliminating the need for manual attention.

FIGS. 1 and 2 are a diagrammatic view illustrating a circuit for stepping a uniselector and showing independent circuits completed by some of the contact banks of the uniselector for carrying out an operating cycle.

FIG. 3 is a plan view of a dial fixed on the end of the uniselector spindle and arranged to indicate the position of the washing operation at any instant.

FIG. 4 is a diagram showing the disposition of FIGS. 1 and 2.

In the following description, well known relays of Post Office type (see "Telephones General Q 1010, Relays 3000 Type" in "Engineering Instructions of the British Post Office Engrg. Dept." published by H. M. Stationary Office; and "Telephony" by Atkinson, published by Pitman, 1950, vol. I, page 112) are referred to, in which it is the convention to number tag positions from 1 upwards on one side of the central buffer block and from 21 upwards on the other side.

As shown in these figures the various stages in the operation of a laundry or textile washing machine such as washers 1, 2, 3 and rinsers 1, 2, 3 and 4 (not shown) are controlled by a uniselector telephone type stepping switch B (see the above cited literature and British Pat. 579,659) having a stepping coil B50 energized by a time pulse unit A. The unit A has a wiper $w$ which is rotated to make one revolution in a predetermined period of time and is provided with two contacts $a$ so connected that a pulse can be taken from one or both contacts to step the uniselector B at for example one or two minute intervals, according to whether pulses are accepted from both contacts or only one as hereafter described.

The uniselector B comprises a plurality of banks—B1, B2, B3, B5, B6, B7, B8, B9, B10. Each bank is formed of 25 contacts arranged in a semi-circle and adapted to be engaged in turn by rotary wipers $b$ stepwise operable by the ratchet wheel disc QR. Except as regards bank B3, banks and wipers are used in pairs, the wiper $b$ of any particular pair being set at 180° to each other so that they engage each bank of the pair alternately. For the pair of banks B1 and B2 the wipers $b$ are of the bridging type, that is to say, in moving from one contact to the next the new circuit is made before the old one is broken. All other wipers are of the non-bridging type. All wipers are moved in unison by the action of the stepping coil B50 in known manner and this also actuates a make and brake contact $a^2$ at each step. As regards the symbols used, TR for example, indicates a relay operating one set of switch contacts and, likewise, the symbol WR indicates a relay operating three sets of switch contacts. The individual contacts of the relay switches are in turn numbered for example, 1, 2, 3 within TR and will be referred to as TR1, TR2, TR3 or 1, 2, 3, 4, 5, 6, 21, 22, 23 within WR and will be referred to as WR1, WR2, WR3, WR4, WR5, WR6, and WR21, WR22, WR23.

The time pulse unit A is normally actuated by a synchronous motor M with a final shaft speed of one revolution in two minutes and is in continuous motion. On the closing of a starting switch $a^1$ a negative potential is applied via connections (not shown) between points ST, to the coils of relays CCV and CHV which become energized to close contacts CCV22—23 and CHV22, CHV23 and as the wiper $w$ of the pulse unit A rotates a pulse will pass either from the lower contact $a$ shown in FIG. 1 and through the normally closed contacts WR21, WR22 into the above mentioned contacts of CCV and CHV or from the upper contact $a$ into the above mentioned contacts of CCV and CHV, and then through the normally closed contacts OV24, OV25, FIN22, FIN23 to energize relay TR.

The energizing of this latter relay closes contacts TR2, TR3, thus energizing the stepping coil B50 of the uniselector B. The release of TR by the rotation of the time pulse unit A will release the stepping coil B50 thereby permitting the spring S to step the wipers $b$ through a step of the wheel QR on to the second contact of each of the banks B1—B10 of the uniselector B.

The banks B9 and B10 are for timing the various washing and rinsing operations and selected contacts on each bank are connected to respective time control switches $A^1$, $A^2$, $A^3$, $A^4$, $A^5$, $A^6$, $A^7$. These switches are multiposition cumulative switches and are assumed in FIG. 1 to be in their zero time positions, with all center contacts thereof joined together and respectively connected to their wiper or rotor. Thus, when the uniselector B steps on to position 2 as described above, a negative potential will be extended from B9 through $A^1$ to the normally closed contact $a^2$ being an element of the uniselector B and being connected to the coil of TR in parallel with the circuit described above, thus energizing TR, and the stepping coil B50 through TR2, TR3. The operation of the uniselector B will break the contact $a^2$ however, and the uniselector B will thus step on to position 3. So long as a path is provided through the time control switches A1—A7 in zero position this process will be repeated rapidly until the uniselector returns to position 1.

By appropriately setting the time switches $A^1$—$A^7$, however, this progressive self stepping action of the uniselector may be eliminated as desired and instead the movement of the uniselector B made to depend on the occurrence of timed pulses from A, thus giving time selection for each stage. The stages corresponding to, and associated with each time switch $A^1$, $A^2$, $A^3$, $A^4$, $A^5$, $A^6$, $A^7$ are respectively, wash 1, wash 2, wash 3, rinse 1, rinse 2, rinse 3, rinse 4.

By reference to FIGS. 1 and 2, it will be seen that during the washing stages of the process, depending on the positions of wipers $b$ of B, an electric current will pass from contacts 2 to 9, 11 to 18, 20 to 30 inclusive, of banks B1, B2, through the coils of relays SS1, SS2 and resistance R1, respectively, and energize the relay WR, thus opening the contacts WR21, WR22. In these circumstances only the pulse from the lower contact $a$ will be accepted via TR from the time pulse unit A (as explained in the fourth preceding paragraph) and thus one step of the uniselector B during the washing stages will be equivalent to two minutes of time, except in so far as this is modified by the setting of the time switches $A^1$ to $A^3$ cooperating with the banks B9, B10 as described above.

The banks B1 and B2 are arranged to initiate the supply of soap, soda and detergent to the washing machine from closed measuring cylinders C, $C^1$, $C^2$. This takes place on the above described energization of relays SS1 and WR, SS2 and WR, and in the case of wash 3 by the energizing of WR alone through resistance R1, respectively. WR operates relays OSO, OSA, OSD through its contacts WR2, WR3. These latter relays control an air blast to the above mentioned cylinders through electro-pneumatic valves D, D1 and D2 and suitable air pipes to the cylinders C, $C^1$, $C^2$, respectively, and are energized only if their electrical circuit is completed through the appropriate quantity selector switch E1, E2, E3, F1, F2, F3, G1, G2, G3 through the liquid, electrodes $c$ and to the corresponding positive electrode, respectively, shown in each cylinder C, $C^1$, $C^2$. The nine quantity selector switches mentioned are shown connected to a number of electrodes $c$ immersed in three different liquids, respectively, in this case soap, soda and detergent and the respective groups of three switches E1-3, F1-3, G1-3 for each of the washing stages are successively connected to the relays OSO, OSA and OSD via relays TSO and TSA, respectively, by three of the contact sets of each of the relays SS1 and SS2, respectively. The electrodes $c$ associated with each solution are insulated one from another as they pass through the walls of the measuring vessel and are electrically connected to the positive electrode only by means of the liquid in the closed vessel. The liquid may then be said to operate as a switch so that when OSO for example is energized as explained above and air enters the closed cylinder C thus expelling the liquid out through the delivery pipe, the level in C will fall until it has just cleared the tip of the electrode which has been previously connected to the wiper of the selector switch E1, E2, E3, respectively, appropriate to the particular liquid and wash concerned, and according to the quantity desired. This thereby opened circuit now allows for the energization of relay TSO in series with OSO and the closure of contacts TSO2, 3 effectively shortcircuits the coil of OSO thus shutting off the air supply through the two-way electro pneumatic valve D. The cylinder C will then refill ready for the next operation. The relay TSO is reset when WR is released at the end of the stage. This will happen when wipers $b$ of B move from position 9 to 10 or from position 18 to 19 or from position 30 to 31 of the uniselector B.

The banks B5 and B6 of the uniselector B control the supply of hot water to the washing machine through relay CHV (FIG. 3). Except in the positions of banks B5, B6 shown connected direct to the center contacts 1–6 of the switches K, K1, K2, K3, K4, K5, K6, respectively, this relay CHV is normally energized thus breaking contacts CHV1, CHV2. The amount of hot water delivered into the machine is controlled by the pre-set switches K, K1, K2, respectively, for the three washes and by the pre-set switches K3, K4, K5, K6, for the four rinses. When a negative potential is applied to relay coil CHV through the closing of start switch $a^1$, the relay is operated, but this operation breaks the circuit to the air valve G so that the potential which is also applied to contact CHV1 of the circuit for the valve G by the start switch $a^1$ cannot operate the valve until the uniselector steps on to position 2. When the uniselector B steps on to position 2, the electro-pneumatic valve G will open (unless CHV is held energized by reason of switch K being set in the "Zero" position), and air will pass to the hot water supply valve associated with the washing machine thus opening the valve, and water for the first wash from the factory's mains or storage tank will flow into the washing machine, gradually covering a series of electrodes $g$. The water will continue to flow into the machine until the level reaches an electrode $g$ pre-selected by the switch K. At this point relay CHV will become energized by passage of the electric current through the water and therefore the circuit to valve G will be broken and the hot water supply shut off. Hot water for the remaining washing stages and the rinsing stages is similarly supplied at appropriate points in the cycle, the amount of water being controlled by the switches K1—K6.

The banks B7 and B8 control the supply of cold water to the washing machine through relay CCV. The amount of cold water delivered into the machine is controlled by pre-set switches H, H1, H2, respectively, for the three washes and pre-set switches H3, H4, H5, and H6 for the four rinses. The cold water is controlled in a similar manner as the hot water and the same electrodes $g$ are employed. The setting of the pre-set switches H to H6 determine the volume delivered at which the relay CCV is operated and thus the point at which the air supply to the cold water valve is cut off through valve K.

During the time when relays CCV and CHV are in the non-energized condition (that is when G and/or K are energized) contacts CCV22, CCV23 and/or CHV22, CHV23 in the pulse circuit are open, this means that no pulse will reach the relay TR to step the uniselector B until the water has reached the pre-selected volume in the washing machine. It is pointed out that both hot and cold water may be fed into the machine at the same time and that their combined volume will therefore determine the depth of water in the machine at any instant. Soap, soda and detergent solutions will also contribute to volume so that the combined volume of all liquids will determine when either the hot or cold water is to be shut off.

The energizing of relays WR and SS1, or WR and SS2, or WR in series with R1 as previously described provides circuits for further pre-set switches M1, M2, M3, and a multi-point thermostat T, which has its bulb or active element set into the liquid in the washing machine. This thermostat may take the form of mercury in glass thermometer with platinum contacts set into its capillary tube. The rise in temperature of the liquid in the washing machine will thus cause the mercury to rise in the thermometer column and so to bridge the various contacts set into it. By reference to FIGS. 1 and 2 it will be seen that the theromstat circuit is operative only when WR is energized, thus closing the contacts WR5, WR6. This occurs during the period of the three washes. Associated with the thermomstat T are three selector switches, M1, M2, M3, one for each wash, and these are brought into circuit very much after the manner of the three selector switches E1-3, F1-3, G1-3 for each of the supplies, soap, soda and detergent, respectively. The temperature selector switch associated with wash 1, is M1 and this is in operation when SS1 operates in series with WR to close contacts SS1 25, SS1 26. The temperature selector switch associated with wash 2 is M2 and this is in operation when SS2 is energized in series with WR to close the appropriate contacts SS2 25, SS2 26. The circuit is completed through contacts SS1 24, SS1 25. The temperature selector switch associated with wash 3 is M3 and this is in operation when WR is energized in series with R1. The circuit is completed through contacts SS1 24, SS1 25, and SS2 24, SS2 25. When a negative potential is applied to the coil of relay OSV through the closure of start switch $a^1$, OSV will operate if WR is in its normal unenergized position. This will have the effect of separating the contacts OSV1, OSV2 and thus preventing the operation of the electropneumatic valve S. On the other hand, if WR5, WR6 are closed OSV will only operate if its circuit is completed through a selector switch M1, M2, or M3 and the appropriate contacts of the thermostat T. This means that when WR5, WR6 are closed the electropneumatic valve S will normally operate, thus opening the main steam valve to the washing machine and this will remain operated until the thermostat comes into action by reason of the increasing temperature of the liquid in the washing machine.

It may be desirable to delay the supply of soda to the first wash by two minutes and this is controlled by bank B3 of the uniselector and manual switch $b^1$. Thus, by leaving $b^1$ in the open position the actuation of electropneumatic valve $D^1$ is delayed until the uniselector B has stepped into contact position 3. Further contacts on bank B3 at positions 11, 12, 20, 21 ensure the normal operation of $D^1$ at the beginning of washes 2 and 3.

On the second step of rinse 4 a predetermined volume of a solution of washing blue may be added to the water from enclosed measuring cylinder N on energization of electro-pneumatic valve $N^1$ in a similar manner as described above for soap, soda and detergent. With the manual switch N connected to its mid or "auto" position a potential is applied from contact 41 of B2 to $N^1$ through contacts BLO22, BLO21, thus operating $N^1$. The same potential is also applied to resistance R2 in series with relay BLO but since the mid point between these two components is connected to an electrode $N^{10}$, BLO will not operate until the blue liquid has been ejected sufficiently far from the measuring vessel $N^{11}$ to clear the tip of $N^{10}$. Operation of BLO will then take place and both the electrode $N^{10}$ and the electro-pneumatic valve $N^1$ will be disconnected.

The resistance R2 is inserted in order to limit the current through $N^{10}$. The manual switch N has an "off" position shown open circuited, when no blue will be added and also a manual operation position directly connecting to negative potential for checking this part of the circuit from time to time or for making extra additions of blue to the machine. Between each wash and each rinse an electro-pneumatic valve controlled by a relay OV through contacts OV2 and 3 is energized from banks B1 and B2 of the uniselector in predetermined positions thereof (FIG. 2). This actuates the main air operated outlet valve of the washing machine, allowing the water from the previous wash or rinse to flow to waste. The outlet valve closes when the uniselector B steps on to the next position. However, the outlet valve does not open at the end of the cycle as the water remaining in the machine may be required for the first wash of the following cycle.

During the "outlet" positions of the uniselector B, check relays GSO, GSA, GSD are brought into operation by the closure of contacts OV22, OV23. These relays become energized only if the soap, soda and detergent measuring cylinders have been properly filled up, thus covering the check electrodes to which they are connected. If one or more of these relays fail to operate, the uniselector B cannot step on to the next set of contacts, since contacts OV24, OV25 in the circuit from the time pulse unit A to the coil of relay TR are separated by operation of OV. One set of contacts of each of the relays GSO, GSA and GSD provide an alternative circuit to the relay TR which is completed when all the relays operate. The closure of contacts OV22, OV23 will also bring a warning light P into operation through contacts GSO21, GSO22 or GSA 21, GSA22 or GSD21, GSD22 if any of the aforementioned relays GSO, GSA, GSD do not operate. The operation of OV will also close the contacts OV5, OV6 so that if the warning light P operates so also will the relay ALM controlling an alarm bell J.

In order to attract the operator's attention to the washing machine at the beginning of any pre-selected stage for the purpose of adding supplies not provided automatically a warning light R is provided which, being connected to particular points on banks B9, B10 and B2 of the uniselector B through the pre-selector switch $R^3$ and contacts RES24 and RES25 of relay RES will give visual warning. The alarm relay ALM will also be operated through contacts FIN1, FIN2 of relay FIN, OV4, OV5 to give audible warning through bell J. This warning, coming on the first step of the selected stage can be stopped or cancelled by the operation of a push button PB (FIG. 1). Closure of the contacts of PB will operate the relay RES which locks itself in energized condition through contacts RES2, RES3 and which separates the contacts RES24 RES25 to break the circuit from the wiper of switch $R^3$ to the warning light R.

The operation RES either by push button PB or by wiper $b$ stepping on to position 50 of bank B2 will prepare the relay FIN for operation when the uniselector B has completed 360° and is back again at position 1. When relay FIN thus becomes operated the warning light Q will show, the contacts FIN2 and FIN3 will close, thus operating the alarm bell through relay ALM and the contacts FIN21 FIN22 will open, thus preventing the acceptance by TR of any further pulses from the time pulse unit A. The opening of the above mentioned start switch $a^1$ by the operator completes the process and shuts off the alarm bell and finish light Q by releasing relay RES which in turn releases relays FIN and ALM. Manually controlled switches MS for each supply are provided which override the automatically controlled switches therefore. Indicator lamps PL are also provided to indicate when any of the electro-pneumatic valves K', G, S, OV, D, $D^2$, $D^1$ are in operation.

A dial QR' (FIGS. 1 and 6) is mounted on the spindle of uniselector B to rotate therewith and with ratchet wheel QR and indicates the stage at any instant of the washing process.

What I claim is:

1. A programmer arrangement for controlling the timing of a plurality of successive process stages and operating conditions for each stage, comprising, in combination, periodic timer means having an input connected to one pole of a source of electrical potential and output means for furnishing electric pulses of predetermined duration and spacing from each other; a rotary type stepping switch means having a plurality of contact banks and corresponding movable contact members respectively cooperating with said contact banks, each of said contact banks having a plurality of spaced contacts for sequentially making electrical contact with the associated one of said movable contact members as the latter are moved between an initial and consecutive positions; stepping means including electromagnetic means for simultaneously moving said movable contact members stepwise at a predetermined rate between said initial and consecutive positions upon energization of said electromagnetic means; a starting switch connected to said one pole of said source; a plurality of first relay switches having coils respectively connected, on one hand, with said starting switch and, on the other hand, across a first group of said contact banks and the respectively associated movable contact members with the other pole of said source, each of said first relays having switch contacts movable between a normally open position and a closed position upon energization of said coils; second relay switch means having coil means connected between said other pole of said source and selected contacts of other ones of said contact banks the movable contact member whereof is connected to said one pole of said source, and having normally closed contacts movable to open position upon energization of said coil means thereof; a normally closed switch device operatively connected with said stepping means for being moved to open position with every stepping movement of said movable contact members; third relay switch means having coil means connected at one end with said other pole of said source and at its other end with said normally open contacts of said first relay switch means in series with said normally closed contacts of said second relay switch means, and having normally open contacts movable to closed position upon energization of said coil means thereof; a first conductive connection between the output means of said periodic timer means and said normally open contacts of said first relay switch means; a second conductive connection between said normally open contacts of said third relay switch means and one terminal of said electromagnetic means, the other terminal thereof being connected to said other pole of said source in such a manner that, after said starting switch is placed in closed position, a first pulse from said periodic timer means will be transmitted to said electromagnetic means for causing said stepping switch means to make one initial step to second position; a third conductive connection between one pole of said normally closed switch device and said other end of said coil means of said third relay switch means; a series of selector switch means respectively associated with the process stages to be controlled and having each a plurality of selectable stationary contacts and a manually movable contact arm capable of being moved into selected positions of electrical contact with any one of said stationary contacts thereof, all of said contact arms being conductively connected with each other and wtih the other pole of said normally closed switch device, a selected stationary contact of one of said selector switch means being conductively connected with the second position of one of said contact banks, the movable contact member thereof being connected to said one pole of said source, so that after the end of said first pulse and of said initial step of said stepping switch and after de-energization of said electromagnetic means through temporary opening of said switch device, an operating potential will be applied from said source through said last mentioned contact bank and, if the contact arm of said one selector switch is in contacting position with said selected stationary contact, through said interconnected contact arms via said now closed switch device to said coil means of said third relay switch means whereby said electromagnetic means is re-energized for causing another step of said stepping switch, said re-energization repeating automatically until said stepping switch is returned to initial position, while otherwise the next step of said stepping switch is caused by the next pulse furnished by said periodic timer means; fourth conductive connections respectively connecting other ones of said stationary contacts of said selector switches with respectively associated contacts of still another group of said contact banks, the associated contact members thereof being connected with said one pole of said source, in such a manner that, if any one of said contact arms is set to a selected position of contacting a selected one of the associated stationary contacts, said automatically repeating re-energization of said electromagnetic means and rapid return of said stepping switch to initial position is possible only after said stepping switch has been moved by said spaced pulses to a position in which the contact members of said last mentioned contact banks are in contact with those contacts of the latter which are connected by said fourth conductive connections with said respectively selected ones of said stationary contacts of said selector switches; and output means connected with selected contacts of said contact banks for delivering potential from said one pole of said source whenever said last mentioned selected contacts of said contact banks are engaged by the associated movable contact member during a stepping procedure of said stepping switch.

2. A programmer arrangement for controlling the timing of a plurality of successive process stages and operating conditions for each stage, comprising, in combination, periodic timer means having an input connected to one pole of a source of electrical potential and output means for furnishing electric pulses of predetermined duration and spacing from each other; a rotary type stepping switch means having a plurality of contact banks and corresponding movable contact members respectively cooperating with said contact banks, each of said contact banks having a plurality of spaced contacts for sequentially making electrical contact with the associated one of said movable contact members as the latter are moved between an initial and consecutive positions; stepping means including electromagnetic means for simultaneously moving said movable contact members stepwise at a predetermined rate between said initial and consecutive positions upon energization of said electromagnetic means; first circuit means connecting said periodic timer means with said stepping means for transmission of said pulses to cause stepping of said stepping switch means in intervals depending upon the spacing of said pulses; normally closed self-interrupter means connected in parallel with said first circuit means and operable by said stepping means for causing, during an interval between said pulses, said electromagnetic means to be first de-energized when a step of said stepping switch is substantially completed, and then to re-energize said electromagnetic means when said movable contact members have been moved from one contact, respectively, to another contact, respectively, of said contact banks; a series of selector switch means respectively associated with the process stages to be controlled and having each a plurality of selectable stationary contacts and a manually movable contact arm capable of being moved into selected positions of electrical contact with any one of said stationary contacts thereof, all of said contact arms being conductively connected with each other and with the other pole of said normally closed self-interrupter device, a selected stationary contact of one of said selector switch means being conductively connected with the second position of one of said contact banks, the movable contact member thereof being connected to said one pole of said source, so that after the end of a first pulse and of an initial step of said stepping switch and after de-energization of said electromagnetic means through temporary opening of said self-interrupter device, an operating potential will be applied from said source through said last mentioned contact bank and, if the contact arm of said one selector switch is in contacting position with said selected stationary contact, through said interconnected contact arms via said now closed self-interrupter device to said electromagnetic means whereby the latter is re-energized for causing another step of said stepping switch, said re-energization repeating automatically until said stepping switch is returned to initial position, while otherwise the next step of said stepping switch is caused by the next pulse furnished by said periodic timer means; second circuit means respectively connecting other ones of said stationary contacts of said selector switches with respectively associated contacts of still another group of said contact banks, the associated contact members thereof being connected with said one pole of said source, in such a manner that, if any one of said contact arms is set to a selected position of contacting a selected one of the associated stationary contacts, said automatically repeating re-energization of said electro-magnetic means and rapid return of said stepping switch to initial position is possible only after said stepping switch has been moved by said spaced pulses to a position in which the contact member of said last mentioned contact banks are in contact with those contacts of the latter which are connected by said second circuit means with said respectively selected ones of said stationary contacts of said selector switches; and output means connected with selected contacts of said contact banks for delivering potential from said one pole of said source whenever said last mentioned selected contacts of said contact banks are engaged by the associated movable contact member during a stepping procedure of said stepping switch.

References Cited in the file of this patent

UNITED STATES PATENTS

| | | |
|---|---|---|
| 1,984,688 | Murray | Dec. 18, 1934 |
| 2,430,668 | Chamberlin | Nov. 11, 1947 |
| 2,504,013 | Ellis | Apr. 11, 1950 |
| 2,563,077 | Schwartz | Aug. 7, 1951 |
| 2,652,197 | Berger | Sept. 15, 1953 |
| 2,788,850 | Leuenberger | Apr. 16, 1957 |
| 2,811,202 | Schild et al. | Oct. 29, 1957 |
| 2,851,099 | Snoddy | Sept. 9, 1958 |

FOREIGN PATENTS

| | | |
|---|---|---|
| 271,995 | Great Britain | June 9, 1927 |
| 729,632 | Great Britain | May 11, 1955 |